United States Patent
Keller

(10) Patent No.: US 9,028,644 B2
(45) Date of Patent: May 12, 2015

(54) METHOD FOR PRODUCING GLASS LAMINATES WITH SOUND ATTENUATING PROPERTIES

(71) Applicant: Kuraray Europe GmbH, Hattersheim (DE)

(72) Inventor: Uwe Keller, Hattersheim (DE)

(73) Assignee: Kuraray Europe GmbH, Hattersheim (DE)

(*) Notice: Subject to any disclaimer, the term of this patent is extended or adjusted under 35 U.S.C. 154(b) by 0 days.

(21) Appl. No.: 14/164,317

(22) Filed: Jan. 27, 2014

(65) Prior Publication Data

US 2014/0224423 A1 Aug. 14, 2014

(30) Foreign Application Priority Data

Feb. 14, 2013 (EP) ..................... 13155178

(51) Int. Cl.
*B32B 37/14* (2006.01)
*B32B 17/10* (2006.01)

(52) U.S. Cl.
CPC ......... *B32B 37/144* (2013.01); *B32B 17/10036* (2013.01); *B32B 17/10568* (2013.01); *B32B 17/10761* (2013.01); *B32B 17/10935* (2013.01)

(58) Field of Classification Search
CPC .................................................. B32B 37/144
USPC ................................. 156/332, 313
See application file for complete search history.

(56) References Cited

U.S. PATENT DOCUMENTS

| | | | |
|---|---|---|---|
| 3,868,286 A * | 2/1975 | Fariss et al. ................... | 156/163 |
| 5,227,241 A | 7/1993 | Chaussade et al. | |
| 5,455,103 A * | 10/1995 | Hoagland et al. ............. | 428/167 |
| 7,312,275 B2 | 12/2007 | Papenfuhs et al. | |
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 2005/0118445 A1 * | 6/2005 | Wong et al. .................... | 428/516 |
| 2011/0076459 A1 * | 3/2011 | Lu et al. ......................... | 428/172 |
| 2012/0325396 A1 * | 12/2012 | Toyama et al. ............... | 156/106 |

FOREIGN PATENT DOCUMENTS

| | | |
|---|---|---|
| CA | 2388107 A1 | 5/2001 |
| EP | 0508864 A1 | 10/1992 |
| EP | 0 566 890 A1 | 10/1993 |
| EP | 1235683 | 9/2002 |
| EP | 1527107 B1 | 5/2005 |
| EP | 1606325 | 12/2005 |
| WO | 0130568 A1 | 5/2001 |
| WO | 03/020776 A1 | 3/2003 |
| WO | 03097347 A1 | 11/2003 |
| WO | 2004063231 A1 | 7/2004 |
| WO | 2004063232 A1 | 7/2004 |

* cited by examiner

*Primary Examiner* — Daniel Lee
(74) *Attorney, Agent, or Firm* — Brooks Kushman P.C.

(57) ABSTRACT

Laminated glass is produced by laminating at least one film A, having a glass transition temperature TA and containing a polyvinyl acetal PA and optionally at least one plasticizer WA, and at least one film B, having a glass transition temperature TB and containing a polyvinyl acetal PB and at least one plasticizer WB, between two glass sheets, wherein, before the lamination process, film A has a proportion of plasticizer WA of less than 24% by weight, film B has a proportion of plasticizer WB of at least 24% by weight, and film A has a thickness of no more than 30% of the thickness of film B.

20 Claims, No Drawings

METHOD FOR PRODUCING GLASS LAMINATES WITH SOUND ATTENUATING PROPERTIES

CROSS-REFERENCE TO RELATED APPLICATIONS

This application claims priority to European Patent Application No. 13155178.0 filed Feb. 14, 2013, the disclosure of which is incorporated in its entirety by reference herein.

BACKGROUND OF THE INVENTION

1. Field of the Invention

Method for producing glass laminates having soundproofing properties by adhesively bonding glass sheets to at least one thin layer which has a low plasticiser content and is based on polyvinyl acetal, and to at least one further layer formed from plasticiser-containing polyvinyl acetal.

2. Background Art

The present invention relates to a method for producing laminated glass sheets by combining layers having different plasticiser content based on polyvinyl acetals having different affinity to plasticisers with subsequent migration of the plasticiser between the layers.

To produce laminated glass sheets having soundproofing or penetration-proof properties, film laminates comprising a plurality of layers based on plasticiser-containing polyvinyl acetals are known. The layers in these film laminates, depending on the field of application, have different mechanical properties. In general, a film laminate for producing soundproofing glazings thus has a middle layer that is soft compared to the outer layers. Penetration-proof film laminates may have a reversed structure.

The production of film laminates by combining PVB sub-films is known from WO 03/097347 A1, EP 0566890 B1 and EP 0508864 B1. Here, sub-films formed from identical PVB polymers containing different plasticisers are combined (WO 03/097347 A1, EP 0508864 B1) or PVB polymers having a high residual acetate content are used (EP 0566890 B1).

In these publications, the combination of a plurality of layers based on plasticiser-containing polyvinyl acetals is proposed for the production of film laminates. Since polyvinyl acetal with a high plasticiser content is very sticky and is soft (that is to say mechanically unstable), combining layers formed from this material is a difficult process. In industrial practice, the production of soundproofing film by means of co-extrusion has therefore prevailed. Here, the sticky layer with high plasticiser content, low glass transition temperature, high ductility and a mechanical damping maximum in the region of room temperature is surrounded by two layers of less sticky PVB film, such that the handling of such a tri-layer film when winding and unwinding, when placing onto glass, etc., is largely determined by the properties of the two external layers of PVB film of normal softness. By contrast, the handling of a thin PVB layer with a high plasticiser content and a glass transition temperature below 10° C. would be impossible from practical viewpoints due to its strong stickiness and excessively low tensile strength.

Co-extruded soundproofing films can be well handled and laminated between glass sheets. A significant disadvantage becomes apparent with these multi-layer products due to their highly restricted ability to be recycled. The unequal distribution of plasticiser between the film layers in contact with one another, necessary to maintain two different glass transition temperatures, requires a difference in polarity of the polyvinyl acetals used in the respective layers, said difference in polarity being set generally by different residual acetate content and/or degree of acetalisation of the polyvinyl acetal. The difference in polarity however means that the polyvinyl acetals can no longer be mixed without phase separation, which, in the case of re-extrusion, leads to milky clouding of the film thus produced.

A further disadvantage lies in the particularly high costs of the mentioned multi-layer films, obtained by co-extrusion, when these are to have further functions, which are likewise introduced into the product by special method variants. In particular, the combination with an ink ribbon additionally extruded in, or the combination with a wedge-like course of the thickness profile of the film web, or both leads to considerably increased production costs, which are passed on in the market.

The problem addressed by the present invention was therefore to provide a method, by means of which glass laminates having good acoustic properties can be obtained, without having to revert to a co-extruded multi-layer film or to a soft damping layer, which is difficult to process. A further problem was to provide cost-effective alternatives for producing glass laminates having combined properties (colour tint, with wedge-shaped thickness profile for head-up, acoustics), with which it is currently necessary to revert to costly special PVB films.

SUMMARY OF THE INVENTION

It has surprisingly been found that laminated glass sheets having good acoustic properties can be obtained by connecting two glass sheets to at least one thicker PVB film having a conventional plasticiser content between 24-36% by weight and also to at least one further, thinner film having a lower plasticiser content. The thin film is extruded separately and contains either no plasticiser at all or has such a low plasticiser content that it neither stretches excessively nor is too sticky during production and further processing under mechanical load.

DETAILED DESCRIPTION OF THE PREFERRED EMBODIMENT(S)

The invention therefore relates to a method for producing a laminated glass by laminating between two glass sheets, at least one film A, having a glass transition temperature TA and containing a polyvinyl acetal PA and optionally at least one plasticiser WA, and at least one film B, having a glass transition temperature TB and containing a polyvinyl acetal PB and at least one plasticiser WB, wherein, before the lamination process, film B has a proportion of plasticiser WA from 24.1 to 36.0% by weight, film A has a proportion of plasticiser WB from 23.9 to 0% by weight and film A has a thickness of no more than 30% of the thickness of film B.

Hereinafter, the "starting state" is understood to mean the state of films A and B before lamination, that is to say the state in which the films are still separate.

Films A and B are produced separately. Films A and B are laminated by being piled up (possibly by unrolling separate film reels formed from film A and B) to form a stack. The laminate or film stack is not produced by joint production of the films, for example by means of joint extrusion of the films. It is of course possible to roll up again a film stack formed from piled up films A and B to form a common film reel and to then unroll this in parts and to position it between two glass sheets.

The layers A and B may contain a single plasticiser and also mixtures of plasticisers both of different and identical composition, both in the starting state before lamination of the layers and in the intermediate layer stack arranged in the laminated glass laminate. Both the type of plasticiser and the proportion thereof in the mixture are intended by the term "different composition". Film A and film B, after lamination, that is to say in the finished laminated glass, preferably have the same plasticiser WA and WB.

Plasticiser-containing films B used in accordance with the invention contain, in the starting state before lamination of the layers, 24.1-36.0% by weight, preferably 25.0-32.0% by weight, and in particular 26.0-30.0% by weight of plasticiser.

Film A with a low plasticiser content used in accordance with the invention may have 23.9 to 0% by weight of plasticizer in the starting state before lamination of the layers, wherein the upper and lower limits of this range may each be 22% by weight, 20% by weight, 18% by weight, 16% by weight, 14% by weight, 12% by weight, 10% by weight, 8% by weight or even no plasticiser (0.0% by weight), in each case independently of one another. Films A with a low plasticiser content most preferably contain 5.0-21.0% by weight of plasticiser.

The position of the distribution equilibrium is not only dependent on material, but also mass. In the method according to the invention, film A in the starting state, before lamination of the layers, therefore has a thickness of no more than 30%, preferably 25%, and preferably no more than 20%, of the thickness of film or films B. The lower limit of the thickness of film A should be at least 1% of the thickness of film or films B. The thickness of film A is particularly preferably 5% or 10% or 15% of the thickness of film or films B.

The thickness of a film A in the starting state, before lamination of the layers, is 20-200 µm, preferably 30-150 µm, more preferably 40-120 µm, yet more preferably 60-100 µm, and most preferably 70-90 µm. In the laminated glass, the thickness of the film increases by transition of plasticiser from film B.

The thickness of a film B in the starting state is 450-1500 µm, preferably 600-1000 µm, more preferably 700-900 µm. With use of a plurality of films B, the same is true for the total thickness thereof. If films B are stretched before production of the sandwich and/or are additionally adapted in an arc-shaped manner to the shape of a sheet (for example windscreen), the specified thicknesses may reduce again by up to 20% at the moment of lamination.

At least one thin film A having a low plasticiser content is oriented here with respect to a glass surface.

In a further embodiment of the invention, the thin film A having a low plasticiser content may also be positioned between two or more thicker films having a higher plasticiser content. In both cases, at least one of the films having a higher plasticiser content may have additional features, such as a band-pass filter, wedge-shaped thickness profile, IR-absorbing properties, acoustic properties, colouring, etc.

In the case of automotive glazing, it is not preferable for aesthetic and durability reasons to seal the edges of the laminated glass laminates with sealants. This promotes the susceptibility of such glazings to the formation of edge defects, such as detachments of the layers from one another (delaminations) or the occurrence of bubbles due to a very soft damping layer reaching as far as the edge of the laminate.

In the method according to the invention, film A having a low plasticiser content can be cut to size and positioned such that it does not reach quite as far as the edge in the laminated glass laminate. In particular, film A in the edge region may be at least 1 mm smaller than at least one glass sheet, with the result that film B in this edge region is in direct contact with at least one glass sheet.

Furthermore, the thin film A having a low plasticiser content or being free from plasticiser in the starting state may be perforated before being inserted into the glass/film sandwich, such that it may have recesses, such as apertures, holes, or slits in arbitrary geometrical patterns.

Film A may thus have at least one recess, with the result that film B is in direct contact with at least one glass sheet through said recess. Once adhesively bonded to the finished laminated glass, film B having a higher plasticiser content in the starting state is adhesively bonded at these points to the glass sheets without interruption, or, with positioning of a thinner film between two thicker films, a direct contact between the latter is produced. The vibration behaviour can thus be influenced selectively, such that vibration properties which cannot be obtained with damping layers located continuously in the component plane and arranged one above the other are accessible on the laminated glass sheet.

A further advantage of the method lies in the fact that, due to the release of plasticiser from the thicker film B having a greater plasticiser content in the starting state to the thin film A having a low plasticiser content in the starting state, the former "post-cures" to a certain extent in the laminated glass laminate. In other words, when producing, unwinding, applying, venting and producing the edge laminate in the respective pre-lamination method, film B has the usual properties and does not have a high hardness, which is unfavourable for processing. Once the end state has been achieved, the glass transition temperature of film B at working temperature has increased due to the lowered plasticiser content in the layer and, in conjunction with the simultaneously resultant soft layer A, leads to very good penetration strength and good acoustic properties.

The method comprises the combination of an arbitrary number of layers, such as 2, 3, 4, 5, 6, 7, 8 or 9 layers.

Irrespective of the number of layers and the composition thereof, plasticiser migrates from layers richer in plasticiser into layers originally having a lower content of plasticiser over the course of the method after combination of the layers to form a film laminate. Due to the migration of the plasticiser, an intermediate layer sequence with layers of different mechanical and/or acoustic properties is obtained in the laminated glass.

In contact with the thicker PVB film with higher plasticiser content, a migration of plasticiser from the relatively thick PVB film rich in plasticiser into the thin PVB film starts during the lamination process, for example during the connection process in an autoclave, whereby, in the end state of the finished laminated glass, the glass transition temperature ($T_g$) of the layer developed from the thin PVB film comes to lie below 10° C., and the acoustic damping maximum thereof comes to lie below 35° C. The end state (that is to say in a thermodynamic equilibrium state at working temperature of 20° C.) of the plasticiser content, of the glass transition temperature and of the damping maximum is substantially dependent here on the chemical structure of the polyvinyl acetals located in the different layers, on the plasticiser quantity available on the whole, and also on the type of plasticiser. The molecular structure of the polyvinyl acetals determines the polarity thereof and the affinity thereof to the different plasticisers.

The migration process of the plasticiser may also be initiated during the autoclave process conventional in laminated glass production. Here, a layered body formed from two glass sheets with intermediate film laminate is exposed to a temperature of 100-150° C. for 1 to 6 hours.

The final properties are set once the thermodynamic equilibrium state has been reached. At a conventional working temperature of 20° C., the setting of the equilibrium state may take up to 8 weeks. This time can be reduced if, in addition to an autoclave process, storage at a warm temperature no more than 40° C. is performed. If storage is carried out at an excessively high temperature, plasticisers demonstrate the tendency to distribute independently of the polarities of the polyvinyl acetals present in the various layers, which does not necessarily correspond to the distribution in the equilibrium state of 20° C.

The processing disadvantages of very soft individual films are avoided, since the modified properties are only set by migration of plasticiser in the intermediate layer stack, which is already fixed in the laminated glass.

The layers used in accordance with the invention contain polyvinyl acetals, which are produced by acetalisation of polyvinyl alcohol or ethylene vinyl alcohol copolymer.

The layers may contain polyvinyl acetals each having a different polyvinyl alcohol content, degree of acetalisation, residual acetate content, ethylene proportion, molecular weight or different chain lengths of the aldehyde of the acetal groups.

In particular, the aldehydes or keto compounds used to produce the polyvinyl acetals may be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinyl (n)acetal used in accordance with the invention results in particular from the reaction of at least one polyvinyl alcohol with one or more aliphatic unbranched keto-compounds containing 2 to 10 carbon atoms. To this end, n-butyraldehyde is preferably used.

The polyvinyl alcohols or ethylene vinyl alcohol copolymers used to produce the polyvinyl acetals in various layers may be identical or different, pure or a mixture of polyvinyl alcohols or ethylene vinyl alcohol copolymers with different degree of polymerisation or degree of hydrolysis.

The polyvinyl acetate content of the polyvinyl acetals in various layers can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The layers preferably contain polyvinyl acetals having a proportion of polyvinyl acetate groups based on the layers, either identically or differently, of 0.1 to 20 mol %, preferably 0.5 to 3 mol %, or 5 to 8 mol %.

The polyvinyl alcohol content of the used polyvinyl acetals PA of film A having a lower plasticiser content in the starting state may be between 6-16% by weight, 8-15% by weight, 10-14% by weight and preferably between 11 and 13% by weight. The polyvinyl alcohol content of the used polyvinyl acetals PB of film B richer in plasticiser in the starting state may be between 14-26% by weight, 16-24% by weight, 18-22% by weight and preferably between 19 and 21% by weight.

The glass transition temperature TA (measurement of Tg according to DIN 53765) of films A in the starting state is in a range from 15-75° C., preferably 17-60° C., more preferably 19-45° C., yet more preferably 20-40° C., still more preferably 21-35° C., and most preferably 22-30° C.

In the finished laminated glass, that is to say after lamination and once the thermodynamic equilibrium has been set, the glass transition temperature of the layer developed from film A after reaching the equilibrium state (TA') is reduced compared to the TA of the starting film by at least 5° C., preferably by at least 10° C., more preferably 15° C., and in particular by at least 20° C. as a result of the incorporation of plasticiser.

The glass transition temperature TB (measurement in accordance with DIN 53765) of at least one film B in the starting state lies in a range from 10-25° C., preferably 14-23° C., more preferably 15-21° C., and most preferably 16-20° C.

Films A and B are preferably combined such that, in the starting state, TA is greater than TB, whereas, in the finished laminated glass, that is to say after lamination and once the thermodynamic equilibrium has been set, the glass transition temperature of the layer developed from film A (TA') is lower than the glass transition temperature of the layer developed from film B (TB').

The sum of (TA−TB)+(TB'−TA') is preferably more than 10° C., 15° C., 20° C., or 30° C.

The layers preferably contain uncrosslinked polyvinyl acetal. The use of cross-linked polyvinyl acetals is also possible. Methods for cross-linking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals cross-linked with polyaldehydes) and WO 03/020776 A1 (polyvinyl acetals cross-linked with glyoxylic acid).

Films A and/or B used in accordance with the invention may contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate Phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

Films A and B particularly preferably contain 1,2-cyclohexane dicarboxylic acid diisononyl ester (DINCH) or triethylene glycol-bis-2-ethyl hexanoate (3GO or 3G8) as plasticiser.

The method according to the invention uses the diffusion-driven displacement of plasticisers between the at least two films A and B in contact with one another, whereby plasticiser contents that are different from the state before producing contact are set in the end state of the thermodynamic equilibrium.

In addition, films A and B may contain further additives, such as residual quantities of water, UV absorber, antioxidants, adhesion regulators, optical brighteners, stabilisers, colorants, processing aids, organic or inorganic nanoparticles, pyrogenic silicic acid and/or surface active substances. In particular, film A may also contain fluorescent additives or may be provided with an IR-absorbing or IR-reflecting coating. Film A may comprise 0.001 to 0.1% by weight of alkaline salts and/or alkaline earth salts of carboxylic acids as adhesion regulators.

The lamination step within the method according to the invention for producing a laminated glass is preferably carried such that films A and B are positioned between the two glass sheets and the layered body thus prepared is pressed under increased or reduced pressure and increased temperature to form a laminate.

It is also possible to bring film A into contact with at least one film B, for example to roll it up into a common film reel or to position it as a tailor-cut semifinished product together with the film stack thus obtained between two glass sheets. The layered body thus prepared is then pressed under increased or reduced pressure and increased temperature to form the laminate.

To laminate the layered body, the methods with which a person skilled in the art is familiar can be used without prior production of a pre-laminate.

What are known as autoclave processes are carried out at an increased pressure from approximately 10 to 15 bar and temperatures from 130 to 145° C. over approximately two hours. Vacuum bag or vacuum ring methods, for example according to EP 1 235 683 B1, function at approximately 200 mbar and 130 to 145° C.

What are known as vacuum laminators can also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A or B is positioned on a glass sheet, and the further film B or A is positioned synchronously or subsequently. The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. Film A is preferably positioned on the first glass sheet and covered by the thicker film B before the second glass sheet is applied. The method can be carried out in many conceivable and, in principle, practicable variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge. In contrast to co-extruded multi-layer soundproofing films, there are no problems here caused by irregular tapering of a very soft damping layer already in the film.

In the automotive field, in particular for the production of windscreens, films that have what is known as an ink ribbon in the upper region are often used. To this end, either the upper part of films A and B can be co-extruded with a suitably coloured polymer melt, or there may be a different colouration in a multi-layer system of one of the films A and B. In the present invention, this can be achieved by complete or partial colouring of at least one of the films A and B.

In the method according to the invention, films B may therefore have a colour tint, which in particular has already been adapted in a prior process step to the geometry of a windscreen.

In the simplest case, film B is a commercially available PVB film with or without ink ribbon and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A. Of course, a film B may already also combine a number of the mentioned functions.

The thin films A are generally produced by extrusion with use of a cast-film line or in the form of a blown film. Here, a surface roughness may also be produced by controlled flow crack or with the cast-film method additionally by use of a structured chill roll.

In addition, a film already produced can be embossed with a regular, non-stochastic roughness by means of an embossing process between at least one cylinder pair. Films used in accordance with the invention preferably have a surface structure, on both sides or preferably one side, with a roughness Rz from 1 to 25 μm, preferably an Rz of from 1 to 20 μm, more preferably an Rz from 3 to 15 μm and in particular, an Rz from 4 to 12 μm. It is particularly preferable if the side of film A coming into contact with the glass sheet has a surface roughness Rz of no more than 20% of its thickness.

Measurements Methods:

The glass transition temperature (Tg) of the films or layers is determined by means of differential scanning calorimetry (DSC) according to DIN 53765 with use of a heating rate of 10 K/min in the temperature interval −50° C.-150° C. A first heating ramp is implemented, followed by a cooling ramp, followed by a second heating ramp. The position of the glass transition temperature is established on the measurement curve relating to the second heating ramp in accordance with DIN 51007. The DIN midpoint (Tg DIN) is defined as the point of intersection of a horizontal at half step height with the measurement curve. The step height is defined by the vertical distance between the two points of intersection of the middle tangent and the base lines of the measurement curve before and after glass transition.

EXAMPLES

The films in Examples 1-8 were produced on a small extruder with cooling cylinder unit of width 35 cm in the specified thicknesses with the specified quantities and types of plasticiser. The polyvinyl butyral used for these examples had a PVOH content of 12.0% by weight and contained residual acetate of 8% by weight. The glass transition temperatures (TA) specified in Table I were measured on the films.

TROSIFOL VG R10 0.76 is a commercially available standard automotive film for the lamination of windscreens in a thickness of 760 μm, with a plasticiser content of 27.5% by weight. The PVB charge used for production had a PVOH content of 20.3% by weight. The glass transition temperature (TB) was measured at 19.2° C.

Before being laid, all films were stored for 24 h in a climate of 23° C./23% rh.

To produce the test laminates, flat glasses of the Planilux® type in 2.1 mm thickness and with 30×30 cm edge length were washed using a glass washing machine conventional in the industry.

The lower sheet was placed on a laying table and the films A of examples 1-8 were each positioned thereabove unwinding from a roll. A layer of the film VG R10 was then placed thereabove, before the sandwich was completed by laying the upper Planilux® sheet. Protruding film was cut off flush with the edge using a sharp blade. The sandwiches were pre-laminated using a cylinder pre-lamination system conventional in the industry and were then adhesively bonded for 90 minutes in an autoclave at a maximum 140° C. and 12 bar pressure to form the final laminate.

Once the glasses had been removed, these were stored at 20° C. in the laboratory and the vibration behaviour was measured weekly on laminate strips removed therefrom measuring 2.5×30 cm in accordance with ISO 16940:2008. After 6 weeks of storage, the loss factors for first and second vibration modes stopped changing, such that the test laminates with the intermediate layer combinations located therein could be considered to be at an equilibrium. The values for loss factor and also the respective resonance frequencies are shown in Table I. A well perceptible acoustic damping of the vibrations of a glass component part can be assumed with loss factors from 0.20. with loss factors above 0.25, a considerably perceptible improvement of the soundproofing and vibration damping can be assumed.

Test laminates having good safety properties and good acoustic properties can thus be produced in a simple manner by combining the thin films having a low plasticiser content of examples 1-8 with the commercially available standard film TROSIFOL VG R10.

Table 2 shows vibration properties according to ISO 16940:2008, measured on laminate strips 2.5×30 cm after 10 weeks of storage at 20° C. and also TA' and TB'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for producing a laminated glass, comprising laminating between two glass sheets at least one film A, having a glass transition temperature TA and containing a polyvinyl acetal PA and optionally at least one plasticiser WA, and at least one film B, having a glass transition temperature TB and containing a polyvinyl acetal PB and at least one plasticiser WB, wherein, before the lamination process,
   film B has a proportion of plasticiser WB from 24.1 to 36.0% by weight,
   film A has a proportion of plasticiser WA from 23.9 to 0% by weight and
   film A has a thickness of no more than 30% of the thickness of film B, wherein film B has a Tg of from 10-25° C.

2. The method of claim 1, wherein film A, before lamination, has a glass transition temperature at least 5° C. higher than layer A developed from film A after lamination.

3. The method of claim 1, wherein film A comprises a polyvinyl acetal PA having a proportion of vinyl alcohol groups from 6 to 16% by weight and film B comprises a polyvinyl acetal PB having a proportion of vinyl alcohol groups from 14 to 26% by weight, the vinyl alcohol group content of polyvinyl acetal PA being less than the vinyl alcohol group content of polyvinyl acetal PB.

4. The method of claim 1, wherein, before lamination, film A has a glass transition temperature TA from 15 to 75° C. and film B has a glass transition temperature TB from 10 to 25° C.

5. The method of claim 1, wherein a film B is arranged between two films A and both films A are in direct contact with a glass sheet.

TABLE 1

|  | Ex. 1 | Ex. 2 | Ex. 3 | Ex. 4 | Ex. 5 | Ex. 6 | Ex.7 | Ex. 8 | Ex. 1-8 |
|---|---|---|---|---|---|---|---|---|---|
| Film | A | A | A | A | A | A | A | A | B |
| Polyvinyl butyral % by weight | 92.5 | 85 | 92.5 | 85 | 77.5 | 92.5 | 85 | 77.5 | 72.5 |
| PVOH (% by weight, in relation to PVB) | 12.0 | 12.0 | 12.0 | 12.0 | 12.0 | 12.0 | 12.0 | 12.0 | 20.3 |
| Plasticiser 3G8 % by weight | 7.5 | 15 |  |  |  |  |  |  | 25 |
| HEXAMOLL ® DINCH % by weight |  |  | 7.5 | 15 | 22.5 |  |  |  |  |
| PLASTOMOLL ® DNA % by weight |  |  |  |  |  | 7.5 | 15 | 22.5 |  |
| Plasticiser DBEA % by weight |  |  |  |  |  |  |  |  | 2.5 |
| Thickness of the film (μm) | 90 | 100 | 90 | 100 | 110 | 85 | 110 | 110 | 760 |
| Tg in the starting state (° C.) | 44.4 | 26.7 | 46.3 | 33.6 | 21.6 | 43.5 | 28.4 | 15.3 | 19.2 |

TABLE 2

| Layer | Ex. 1 A | Ex. 2 A | Ex. 3 A | Ex. 4 A | Ex. 5 A | Ex. 6 A | Ex. 7 A | Ex. 8 A | Ex. 1-8 B |
|---|---|---|---|---|---|---|---|---|---|
| Tg of layer A (TA') 10 weeks after lamination | 10.2 | 7.2 | 10.8 | 6.5 | 4.0 | 11.0 | 5.4 | 3.5 | — |
| Tg of layer B (TB') 10 weeks after lamination | 24.7 | 20.8 | 22.6 | 21.4 | 20.3 | 23.2 | 21.0 | 19.7 | — |
| Loss factor f1 at 20° C. | 0.228 | 0.268 | 0.238 | 0.278 | 0.312 | 0.22 | 0.258 | 0.306 | — |
| Loss factor f2 at 20° C. | 0.332 | 0.358 | 0.334 | 0.368 | 0.388 | 0.33 | 0.36 | 0.382 | — |
| Resonance frequency f1 at 20° C. | 179 | 174 | 179 | 173 | 163 | 181 | 174 | 164 | — |
| Resonance frequency f2 at 20° C. | 925 | 880 | 914 | 877 | 803 | 919 | 880 | 815 | — |

6. The method one of claim 1, wherein film A comprises 0.001 to 0.1% by weight of alkaline salts and/or alkaline earth salts of carboxylic acids.

7. The method of claim 1, wherein film A in the edge region is at least 1 mm smaller than at least one glass sheet, with the result that film B in this edge region is in direct contact with at least one glass sheet.

8. The method of claim 1, wherein film A has at least one recess, with the result that film B is in direct contact with at least one glass sheet through this recess.

9. The method of claim 1, wherein at least one of film A or film B, prior to lamination, contains at least one plasticizer not present in the other film prior to lamination, and both films A and B comprise the same plasticisers after lamination, as a result of plasticizer migration.

10. The method of claim 1, wherein film A is positioned on a glass sheet, is then covered with at least one film B, onto which a second glass sheet is laid.

11. The method of claim 1, wherein film A is brought into contact with at least one film B to form a film stack, and the film stack thus obtained is positioned between two glass sheets.

12. The method of claim 1, wherein the side of film A coming into contact with the glass sheet has a surface roughness Rz of no more than 20% of its thickness.

13. The method of claim 1, wherein film B is wedge-shaped in thickness.

14. The method of claim 1, wherein film B has a colour tint.

15. The method of claim 1, wherein a single film B and a single film A are present.

16. The method of claim 1, wherein film A has a Tg of from 20-30° C.

17. The method of claim 1, wherein at least one film A directly contacts a glass surface.

18. The method of claim 1, wherein film A has a Tg of TA prior to lamination and a Tg of TA' following lamination, film B has a Tg of TB prior to lamination and a Tg of TB' following lamination, and the sum (TA−TB)+(TB'−TA') is more than 10° C.

19. The method of claim 18, wherein the sum (TA−TB)+(TB'−TA') is more than 15° C.

20. The method of claim 18, wherein the sum (TA−TB)+(TB'−TA') is more than 20° C.

* * * * *

UNITED STATES PATENT AND TRADEMARK OFFICE
CERTIFICATE OF CORRECTION

| | | |
|---|---|---|
| PATENT NO. | : 9,028,644 B2 | Page 1 of 1 |
| APPLICATION NO. | : 14/164317 | |
| DATED | : May 12, 2015 | |
| INVENTOR(S) | : Uwe Keller et al. | |

It is certified that error appears in the above-identified patent and that said Letters Patent is hereby corrected as shown below:

In the claims

Column 11, Line 1, Claim 6:

After "The method"
Delete "one"

Signed and Sealed this
Twentieth Day of October, 2015

Michelle K. Lee
*Director of the United States Patent and Trademark Office*